United States Patent [19]
Toboll

[11] 3,788,702
[45] Jan. 29, 1974

[54] BULK MATERIAL HANDLING SYSTEM

[76] Inventor: Carl L. Toboll, 8003 Haas Ln., Rosedale, Md. 21237

[22] Filed: Feb. 9, 1972

[21] Appl. No.: 224,874

[52] U.S. Cl. ............. 298/22 AE, 105/378, 105/406
[51] Int. Cl. ........................... B60p 1/18, B60p 1/28
[58] Field of Search...298/22 AE, 22 P; 296/15, 296/28 M; 214/83.28, 301, 302, 306, 307; 180/6.2; 105/258, 378, 406; 280/2

[56] References Cited
UNITED STATES PATENTS

| | | | |
|---|---|---|---|
| 1,652,262 | 12/1927 | Walter | 298/22 AE |
| 1,961,193 | 6/1934 | Brumbaugh | 298/22 P |
| 2,226,193 | 12/1940 | Barrett | 298/22 P |
| 2,890,909 | 6/1959 | Hutchinson | 298/22 P |
| 2,953,410 | 9/1960 | Chaney | 298/22 AE |
| 3,006,492 | 10/1961 | Haughton | 296/28 M |
| 3,256,042 | 6/1966 | Hunsaker | 298/22 AE |
| 1,233,596 | 7/1917 | Neikirk | 105/258 |
| 2,166,722 | 7/1939 | Kirksey | 298/22 AE |
| 2,953,408 | 9/1960 | Koenig | 105/258 |
| 3,603,424 | 9/1971 | Blood | 180/6.2 |
| 3,640,578 | 2/1972 | Finney | 298/22 AE |

FOREIGN PATENTS OR APPLICATIONS

| | | | |
|---|---|---|---|
| 1,505,408 | 10/1969 | Germany | 298/22 AE |

*Primary Examiner*—Richard J. Johnson
*Assistant Examiner*—Reinhard J. Eisenzopf
*Attorney, Agent, or Firm*—Walter G. Finch

[57] ABSTRACT

An improved system for the handling of bulk materials such as trash refuse, is provided. This system consists of two units, one of which is a large drop frame trailer, enclosed on all of its four sides, with door openings on the sides, the rear end and the top completely open, for loading. A door opening is also provided at the rear end for unloading. The other unit is a modified tractor on which is mounted a hydraulic operated hoist. It has a fifth wheel coupling arrangement and a capability of lifting the trailer up end to a required height of 30 feet for unloading of the trash refuse.

5 Claims, 5 Drawing Figures

PATENTED JAN 29 1974  3,788,702

BULK MATERIAL HANDLING SYSTEM

This invention relates generally to bulk material handling systems, and more particularly it pertains to an improved device for the handling of bulk materials, such as trash refuse.

In the trucking field where refuse and trash is being hauled, there is a need for a lift boom device to dump trailers off the road. The present day tractor-trailer arrangements are not adequate to haul large loads and then take the trash container trailer off the road and dump it at the selected disposal site.

In this invention, a conventional tractor is used for pulling a trailer on the highway. When the landfill site is reached (which changes daily on the large acreage landfill), the trailer is disconnected from the conventional tractor which is used to bring it there. The trailer is then connected with a tractor that has been modified with the lifting device. This modified tractor takes the trailer to the dumping site.

The mechanical connection between the modified tractor and the trailer is the same as the connection to the conventional tractor. The actual need for dumping the trailer varies over conventional models of lifting devices. It was ascertained that a truck tractor was needed with a centered load applied to the rear axles of the truck rather than the back axles of the trailer.

In the conventional tractor-trailer dump situation when the trailer body raises either in a plain type dumping trailer or a plain height dumping trailer, all of the weight of the trailer or load is placed on the rear axle of the trailer.

In this invention, the weight is placed on the rear axles of the truck in order to maintain traction and floation on the soft conditions of the landfill area.

In this invention, in the modified trailer, a lift boom is installed, and it is hinged behind the cab of the modified truck with the weight bearing over the center of the rear of the drive-wheels of the truck.

This enables the modified truck to lift the trailer container and, at this point, at the height required it is possible to pull and place the trailer in the unloading operation. In such cases, when the trailer is raised, it may be necessary to move 25 to 30 feet forward to distribute the load. This design of the lift boom is where the conventional method of dumping is reversed. All the weight of the trailer and the load is placed on the back-end of the truck as compared to the conventional way of putting all the weight of the trailer and the load on the rear axle of the trailer.

The lift boom of this invention is capable of picking up and dumping up to a 40 to 45 foot trailer at the proper angle to unload or disperse bulked milled trash. Milled trash is a light commodity which has to have a high degree angle in dumping in order for it to fall out of the trailer.

The present invention makes it possible to lift 25' 6" from the ground up or 22' 3" from the frame up. This is an adequate angle to dump a 44 foot trailer. It is possible to actually pick the the wheels of the trailer off the ground in the fashion to unload the trailer completely. As the trailer is in this raised position, it is possible to pull it forward and disperse the load of the trailer on the surface rather than on the back and dump it into a hole like conventional lift mechanisms are designed for.

An out rigger arrangement is provided on the bottom of the base of the boom which makes it possible to raise the trailer for full height and move around with complete mobility and safety while this trailer is in this position.

To facilitate the handling of trash refuse that is deposited by people for disposal at neighborhood pick-up stations and at land fill areas, and also to assist the ecology movement in preserving a clean environment, a more efficient and less expensive method and apparatus are provided.

It is the object of this invention, therefore, to provide a large trailer with an open top and side and rear door openings in which trash refuse can be deposited and which can be parked at various pick-up stations and at the entrance of land-fill areas.

Another object of this invention is to provide a tractor so designed as to make it possible to lift a 35 foot long trailer, dump its contents, and to move it about freely on the rough terrain of land-fill without fear of over-turning of the trailer.

A further object of this invention is to provide a hydraulic operated hoist which is mounted on a trailer and is capable of lifting a trailer to a required 30 feet in height for dumping, which lifting is higher than with conventional hoists.

A still further object of this invention is to provide a more positive maneuverability of a tractor by having separate braking systems, one for each side of the vehicle.

Still another object of this invention is to provide a tractor-trailer system which has better traction by having the weight of the trailer centered over the tractor drive wheels, rather than on the rear wheels of the trailer during the unloading and spreading operation.

Other objects and attendant advantages of this invention will become more readily apparent and understood from the detailed specification and accompanying drawings in which:

FIG. 3b is a side elevational view of tractor hauling the trailer of FIG. 3a.

Figure 1:
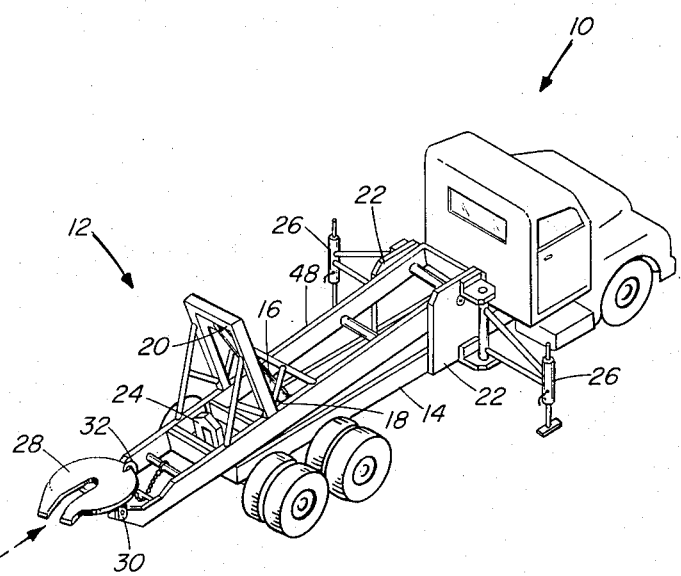
FIG. 1 is a perspective view of a tractor with a hoist mounted thereon and shown in its rest position and with stabilizing members being shown fully extended.

Referring now to the drawings in which like reference numbers refer to like parts in all figures, there is shown in FIG. 1 a tractor 10 with a hoist 12 mounted thereon. The tractor 10 is of a standard type with the exception of a chassis 14. To accommodate the hoist 12, the chassis 14 is lengthened.

The hoist 12 is hydraulically operated by either one or two hydraulic pistons 16 which are attached, one end 18 to the tractor chassis 14 and the other end 20 to the re-enforced cross member of the hoist. Hydraulic pressure is applied to the piston 16 to raise the hoist 12 which is pivoted between two mounting plates 22. A guide plate 24 keeps the two beams 48 parallel with the chassis 14 when the hoist 12 is in its rest position, as shown in FIG. 3a.

Figure 3A:
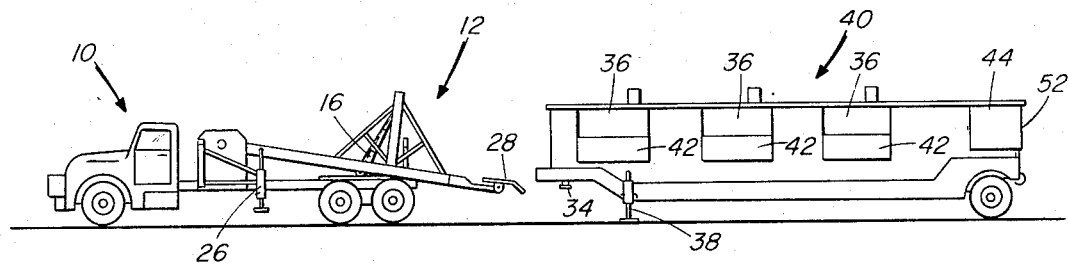
FIG. 3a is a side elevational view of the trailer and the tractor coupled together.

There are two swing-out stabilizers 26 provided, one on each side of the tractor 10, and they are attached to the hoist mounting plates 22, as shown in FIGS. 1 and 3a. They are used when the hoist 12 is in operation.

There is mounted on the far rear end of the hoist 12 a standard fifth wheel coupler plate 28. This coupler plate 28 is swivel mounted at 30 and is held in place by a hook 32. As the coupler plate 28 mates with the trailer coupling pin 34, as shown best in FIGS. 1 to 3b, the hook 32 is dislodged, thus allowing the coupler plate 28 to rotate about its mounting pins 30 as the trailer 40 is being lifted.

Figure 2:
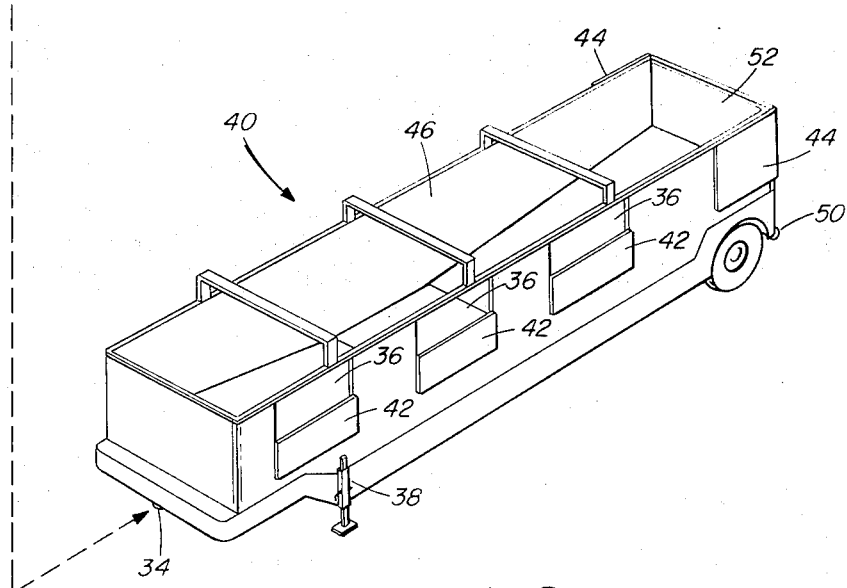
FIG. 2 is a perspective view of a trailer showing an open top and side and rear door openings.

In FIG. 2, there is shown the trailer 40 in its parked position. The front end of the trailer 40 is supported by the two adjustable jacks 38, one mounted on each side of the trailer 40. The side doors 42 and the rear end doors 44 are shown open.

Figure 3B:
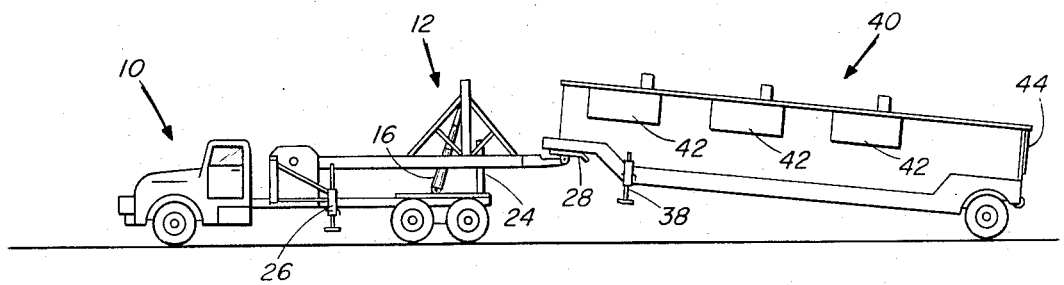
Figure 3C:
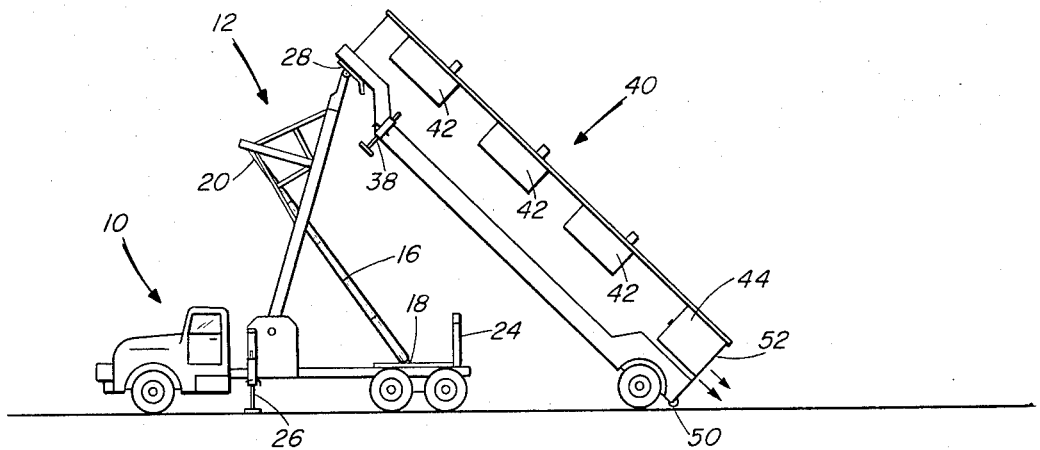
FIG. 3c is a side elevational view of the tractor and trailer of FIG. 3a showing the trailer lifted up by the tractor hoist, for unloading.

In FIGS. 3a, 3b, and 3c, there is shown the sequence of operation of the tractor 10 and the trailer 40.

The trailer 40 is parked at a pick-up station, or at the entrance of a land-fill to receive deposits of refuse. The loading is done through the side openings 36 or the rear end opening 52. If the trailer 40 is parked below ground level, it can be loaded into its open top 46.

When the trailer 40 is fully loaded, the tractor 10 is backed up and coupled onto the trailer 40 as shown in FIG. 3a. The hoist 12 then lifts the trailer 40 up to the hauling position as shown in FIG. 3b.

The load of refuse is then taken into the land-fill area for dumping. The terrain is usually rough and in order to insure a more positive maneuverability of the tractor 10 and the trailer 40, a separate braking system is provided for each side of the vehicle.

FIG. 3c shows the tractor 10 with its swing out stabilizers 26 fully extended and with the hoist 12 lifting the trailer 40 to its highest up-end position. The rear doors 44 on the trailer having been opened and secured to the sides, now permit the load of trash refuse to be completely dumped. The rear end roller 50 of the trailer 40 prevents drag when the trailer 40 is pulled forward to spread out the load.

By moving the tractor 40 forward, the load can be spread out. The trailer 40 after being emptied is hauled back by the tractor 10 to its receiving station to repeat the cycle.

The truck system is capable of lifting, moving and dumping any van type, or stake body, or flat bed type of straight axle truck. In order to achieve this, it will be necessary to utilize a conventional pin with a chain attached to the connection with the fifth wheel coupler plate 28.

Obviously many modifications and variations of the present invention are possible in light of the above teachings. It is, therefore, to be understood that within the scope of the appended claims the invention may be practiced otherwise than as specifically described.

What is claimed is:

1. A bulk material handling system for handling trash refuse, comprising, a tractor including a rear axle and a chassis, a portion of said chassis extending over said rear axle, a hydraulic operated hoist mounted on said chassis over said rear axle, and a large dry frame type trailer detachably attachable to said tractor independently of any engagement with and elevatable by said hoist, with the sides of said trailer being enclosed with door openings on the sides and the rear end thereof, and with the top completely open, for loading; said trailer having an inclined floor which covers the rear wheel wells and produces a smooth unobstructed surface that allows the load to be dumped freely from said trailer.

2. A bulk material handling system as recited in claim 1, said hydraulically operated hoist being capable of lifting said trailer up-end to a pre-determined height for dumping.

3. A bulk material handling system as recited in claim 1, wherein said tractor has a separate braking system for each side, thereby giving it better maneuverability in the rough terrain of a land-fill.

4. A bulk material handling system as recited in claim 1, and additionally a lift boom hinged at one end for pivotal movement to a portion of said chassis forward of said rear axle, said opposite end of said boom attachable to said trailer and said hoist attached to an intermediate portion of said lift boom.

5. A bulk material handling system as recited in claim 4, and additionally said opposite end of said lift boom extending rearwardly and in cantilever from said chassis and said rear axle so that said lift boom is longer than the portion of said chassis which extends rearwardly from the point at which said lift boom is hinged to said chassis.

* * * * *